United States Patent
Han et al.

(10) Patent No.: US 12,469,556 B2
(45) Date of Patent: Nov. 11, 2025

(54) SEMICONDUCTOR DEVICE AND OPERATING METHOD OF SEMICONDUCTOR DEVICE

(71) Applicant: SK hynix Inc., Gyeonggi-do (KR)

(72) Inventors: Chang Hyun Han, Gyeonggi-do (KR); Moon Soo Sung, Gyeonggi-do (KR)

(73) Assignee: SK hynix Inc., Gyeonggi-do (KR)

( * ) Notice: Subject to any disclaimer, the term of this patent is extended or adjusted under 35 U.S.C. 154(b) by 188 days.

(21) Appl. No.: 18/296,373

(22) Filed: Apr. 6, 2023

(65) Prior Publication Data
US 2024/0185920 A1 Jun. 6, 2024

(30) Foreign Application Priority Data

Dec. 1, 2022 (KR) .......................... 10-2022-0165604

(51) Int. Cl.
G11C 16/08 (2006.01)
G11C 16/04 (2006.01)
G11C 16/14 (2006.01)
G11C 16/26 (2006.01)

(52) U.S. Cl.
CPC .......... *G11C 16/08* (2013.01); *G11C 16/0433* (2013.01); *G11C 16/14* (2013.01); *G11C 16/26* (2013.01)

(58) Field of Classification Search
CPC ..... G11C 16/08; G11C 16/0433; G11C 16/14; G11C 16/26; G11C 16/0483; G11C 16/30; G11C 8/14
USPC .................................................... 365/185.13
See application file for complete search history.

(56) References Cited

U.S. PATENT DOCUMENTS 8,917,554 B2 12/2014 Toyama et al.
2021/0375367 A1* 12/2021 Senoo .................... G11C 16/24

FOREIGN PATENT DOCUMENTS

KR 10-1406228 B1 6/2014

* cited by examiner

*Primary Examiner* — Huan Hoang
(74) *Attorney, Agent, or Firm* — IP & T GROUP LLP

(57) ABSTRACT

A semiconductor device may include: a cell array including memory cells connected to local word lines; pass transistors that connect global word lines and the local word lines in response to a block selection signal; an operation voltage supplying circuit that applies a read voltage or a pass voltage to the global word lines; and a well bias supplying circuit that, during a read operation, applies a well bias having a negative level to a well region of the pass transistor connected to a selected local word line, in a discharge period in which an unselected local word line is discharged.

25 Claims, 13 Drawing Sheets

SEMICONDUCTOR DEVICE AND OPERATING METHOD OF SEMICONDUCTOR DEVICE

CROSS-REFERENCE TO RELATED APPLICATION

This application claims priority under 35 U.S.C. § 119 to Korean Patent Application No. 10-2022-0165604 filed on Dec. 1, 2022, which is incorporated herein by reference in its entirety.

BACKGROUND

1. Technical Field

Embodiments of the present disclosure relate to an electronic device, and more particularly, to a semiconductor device and an operating method thereof.

2. Related Art

The degree of integration of a semiconductor device is mainly determined by an area occupied by a unit memory cell. Recently, as the improvement in the degree of integration of a semiconductor device for forming memory cells in a single layer on a substrate reaches a limit, a three-dimensional (3D) semiconductor device for stacking memory cells on a substrate has been proposed. Furthermore, in order to improve the operational reliability of such a semiconductor device, various structures and manufacturing methods have been developed.

SUMMARY

In an embodiment of the present disclosure, a semiconductor device may include: a cell array including memory cells connected to local word lines; pass transistors that connect global word lines to the local word lines in response to a block selection signal; an operation voltage supplying circuit that applies a read voltage or a pass voltage to the global word lines; and a well bias supplying circuit that, during a read operation, applies a well bias having a negative level to a well region of the pass transistor connected to a selected local word line, in a discharge period in which unselected local word line are discharged.

In an embodiment of the present disclosure, a semiconductor device may include: a cell array including memory cells connected to local word lines; pass transistors that connect global word lines to the local word lines in response to a block selection signal; an operation voltage supplying circuit that applies a read voltage or a pass voltage to the global word lines; and a well bias supplying circuit that during a read operation, floating a well region of the pass transistor connected to a selected local word line, in a discharge period in which unselected local word lines are discharged.

In an embodiment of the present disclosure, a semiconductor device may include: a cell array including a memory cell connected to a local word line and select lines connected to local select lines; pass transistors that connect global select lines to the local select lines in response to a block selection signal; an operation voltage supplying circuit that applies an erase voltage to at least one of a bit line and a source line; and a well bias supplying circuit, during an erase operation, that applies a well bias having a negative level to a well region of the pass transistors that connect the local select lines to the global select lines or floats the well region, in a discharge period in which the local select lines are discharged.

In an embodiment of the present disclosure, an operating method of a semiconductor device may include: applying a read voltage to a selected local word line; applying a pass voltage to at least one unselected local word line; and discharging the unselected local word line, wherein, in the discharging, a well bias having a negative level is applied to a well region of a pass transistor that connects the selected local word line to a global word line.

In an embodiment of the present disclosure, an operating method of a semiconductor device may include: applying a read voltage to a selected local word line; applying a pass voltage to at least one unselected local word line; and discharging the unselected local word line, wherein, in the discharging, a well region of a pass transistor that connects the selected local word line to a global word line is floated.

In an embodiment of the present disclosure, an operating method of a semiconductor device may include: applying an erase voltage to at least one of a bit line and a source line; raising a voltage level of a local select line to a level less than a voltage level of the erase voltage; applying a ground voltage to a local word line; and discharging the voltage level of the local select line, wherein, in the discharging, a well bias having a negative level is applied to a well region of a pass transistor that connects the local select line to a global select line, or the well region is floated.

In an embodiment of the present disclosure, a semiconductor device may include: a cell array including a plurality of memory cells; a plurality of local word lines coupled to the memory cells; a plurality of global word lines; a plurality of pass transistors; and a voltage generation circuit configured to generate a read voltage, a pass voltage and first and second well biases, wherein one of the pass transistors is selected in response to a block selection signal to couple a selected global word line with a selected local word line, and wherein the voltage generation circuit is configured to: in a read period, apply the read voltage to the selected global word line, apply the pass voltage to unselected global word lines, and apply the first well bias to a well region of the selected pass transistor, the first well bias having a first negative level; and in an equalizing period, raise the read voltage applied to the selected global word line, maintain the pass voltage applied to the unselected global word lines, and apply the second well bias to the well region of the selected pass transistor, the second well bias having a second negative level greater than the first negative level.

DETAILED DESCRIPTION

Various embodiments of the present disclosure are directed to a semiconductor device having improved operational reliability and an operating method thereof.

By stacking memory cells in three dimensions, it is possible to improve the degree of integration of a semiconductor device. It is possible to provide a semiconductor device having a stable structure and improved reliability. It is possible to improve a read operation of a semiconductor device.

Hereafter, embodiments in accordance with the present disclosure will be described with reference to the accompanying drawings.

Figure 1:
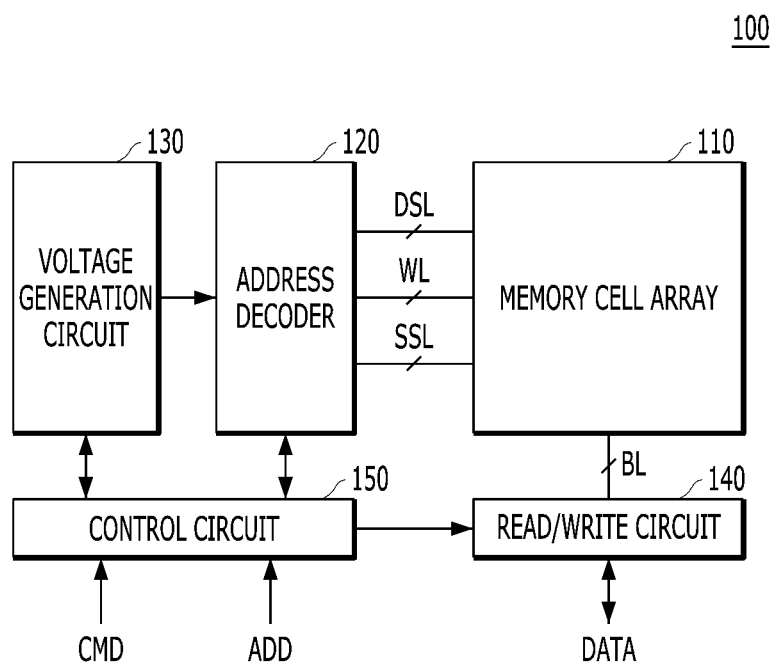
FIG. 1 is a diagram illustrating the configuration of a semiconductor device in accordance with an embodiment of the present disclosure.

FIG. 1 is a diagram illustrating the configuration of a semiconductor device 100 in accordance with an embodiment of the present disclosure.

Referring to FIG. 1, the semiconductor device 100 may include a memory cell array 110, an address decoder 120, a voltage generation circuit 130, a read/write circuit 140, and a control circuit 150.

The memory cell array 110 may include memory cells. As an example, the memory cell array 110 may include memory blocks, and each of the memory blocks may include pages. The memory block may be a unit of an erase operation, and a page may be a unit of a read operation. The memory cell array 110 may be connected to the address decoder 120 through row lines such as a source select line SSL, a word line WL, and a drain select line DSL. The memory cell array 110 may be connected to the read/write circuit 140 through a column line such as a bit line BL.

The control circuit 150 may receive a command CMD and an address ADD from a controller. The control circuit 150 may generate a control signal to perform internal operations such as a program operation, a read operation, and an erase operation according to the received command CMD. The control circuit 150 may output the control signal to the voltage generation circuit 130, the address decoder 120, and the read/write circuit 140.

The voltage generation circuit 130 may generate internal voltages having various voltage levels for performing internal operations, and provide the generated internal voltages to the address decoder 120. The internal voltage may be an operation voltage for performing the program operation, the read operation, the erase operation, or the like. The internal voltage may be a well bias to be supplied to a well region of a pass transistor included in the address decoder 120. The internal voltages may each have a positive level or a negative level.

As an example, the voltage generation circuit 130 may generate a program voltage, a pass voltage, and the like for performing the program operation. The voltage generation circuit 130 may generate a read voltage, a pass voltage, and the like for performing the read operation. The read voltage may have a voltage level for turning on or off a selected memory cell according to a program state of the selected memory cell. The pass voltage may have a voltage level for turning on a memory cell regardless of a program state of the memory cell. The read voltage may be a verification voltage for verifying the program operation or the erase operation. The voltage generation circuit 130 may generate an erase voltage or the like for performing the erase operation. The voltage generation circuit 130 may generate a well bias for controlling the voltage level of the well region of the pass transistor included in the address decoder 120 when the program operation, the read operation, or the erase operation is performed.

The address decoder 120 may activate a source select line, a word line, or a drain select line according to an address. The address decoder 120 may transfer a voltage level of a global line to a local line.

The read/write circuit 140 may be connected to the memory cell array 110 through bit lines BL. During the program operation, the read/write circuit 140 may operate as a writer driver and input data to be stored in the memory cell array 110. During the read or verification operation, the read/write circuit 140 may operate as a sense amplifier and output data stored in the memory cell array 110.

Figure 2:
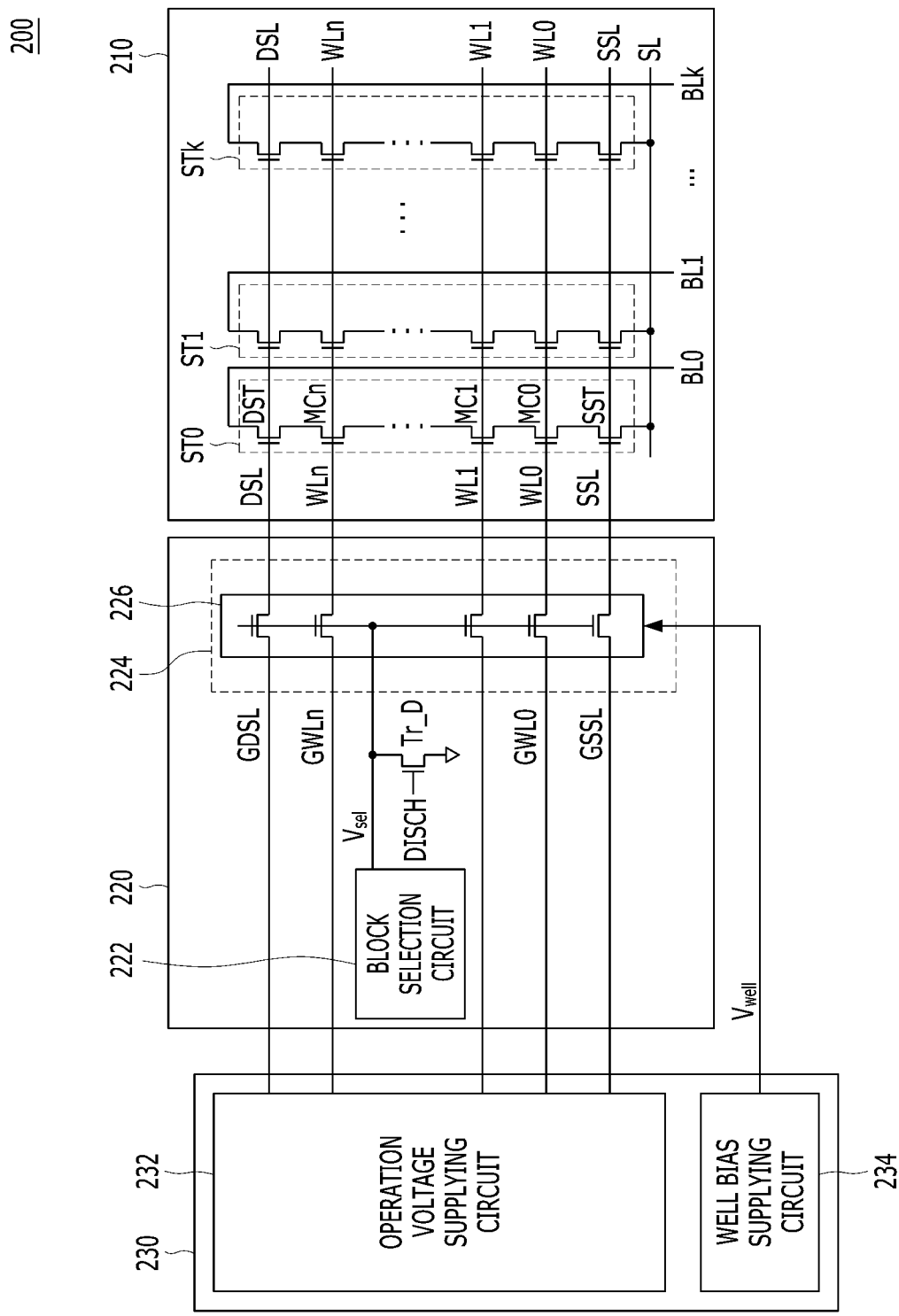
FIG. 2 is a diagram illustrating the configuration of a semiconductor device in accordance with an embodiment of the present disclosure.

FIG. 2 is a block diagram showing the configuration of a semiconductor device 200 in accordance with an embodiment of the present disclosure. Hereinafter, the content overlapping with the previously described content may be omitted.

Referring to FIG. 2, the semiconductor device 200 may include a memory cell array 210, an address decoder 220, and a voltage generation circuit 230.

The memory cell array 210 may include memory strings ST0 to STk connected between bit lines BL0 to BLk and a source line SL. Here, k may be an integer equal to or greater than 1. Each of the memory strings ST0 to STk may include at least one drain select transistor DST, a plurality of memory cells MC0 to MCn, and at least one source select transistor SST. Here, n may be an integer equal to or greater than 1. The memory cells MC0 to MCn may be connected to local word lines WL0 to WLn. The source select transistor SST may control a connection between the memory strings ST0 to STk and the source line SL, and the drain select transistor DST may control a connection between the memory strings ST0 to STk and the bit lines BL0 to BLk.

The address decoder 220 may include a block selection circuit 222 and pass transistors 224. The pass transistors 224 may control a connection between a global line and a local line. In an example, the pass transistor 224 may control a connection between a global drain select line GDSL and a local drain select line DSL. The pass transistor 224 may control a connection between global word lines GWL0 to GWLn and the local word lines WL0 to WLn. The pass transistor 224 may control a connection between a global source select line GSSL and a local source select line SSL.

The block selection circuit 222 may generate a block selection signal Vsel in response to an address, and transfer the generated block selection signal Vsel to the pass transistors 224. A discharge transistor Tr_D may discharge a line, through which the block selection signal Vsel is transferred, in response to a discharge signal DISCH.

The pass transistors 224 may operate in response to the block selection signal Vsel of the block selection circuit 222. The block selection signal Vsel may be applied to gates of the pass transistors 224, and when the pass transistor 224 is turned on by the block selection signal Vsel, the global line and the local line may be electrically connected to each other. The pass transistors 224 may be high voltage transistors formed in a triple well structure. The pass transistors 224 may share a well region 226, and control operations of the pass transistors 224 by a well bias Vwell applied to the well region 226.

The voltage generation circuit 230 may include an operation voltage supplying circuit 232 and a well bias supplying circuit 234. The operation voltage supplying circuit 232 may generate operation voltages required for a program operation, a read operation, and an erase operation of memory cells, and transfer the generated operation voltages to global lines. In an example, during the program operation, the operation voltage supplying circuit 232 may transfer a program voltage or a pass voltage to a global word line. During the read operation, the operation voltage supplying circuit 232 may transfer a read voltage or a pass voltage to the global word line. During the erase operation, the operation voltage supplying circuit 232 may transfer an erase voltage to at least one of a global drain select line GDSL and a global source select line GSSL, and may transfer a ground voltage to the global word line GWL0 to GWLn.

The well bias supplying circuit 234 may generate a well bias Vwell and apply the generated well bias Vwell to the well region 226 of the pass transistors 224. Depending on an operation period, the well bias supplying circuit 234 may apply the well bias Vwell having various levels to the well region 226. The well bias Vwell may have a positive level, a negative level, or a ground level.

In an example, the read operation may include a read period in which the read voltage having a negative level is applied to selected local word lines WL0 to WLn, and may further include an equalizing period and a discharge period. In the read period, the well bias supplying circuit 234 may apply a first well bias Vwell having a first negative level to the well region 226. In the equalizing period and the discharge period, the well bias supplying circuit 234 may apply a second well bias Vwell having a second negative level higher than the first negative level to the well region 226.

In an example, the read operation may include a read period in which the read voltage having a positive level is applied to the selected local word lines WL0 to WLn, and may further include an equalizing period and a discharge period. In the read period, the well bias supplying circuit 234 may apply the first well bias Vwell having a ground level to the well region 226. In the equalizing period and the discharge period, the well bias supplying circuit 234 may apply the second well bias Vwell having a negative level to the well region 226.

In an example, the read operation may include a read period in which the read voltage having a negative level is applied to the selected local word lines WL0 to WLn, and may further include an equalizing period and a discharge period. In the read period, the well bias supplying circuit 234 may apply the first well bias Vwell having a first negative level to the well region 226. In the equalizing period, the well bias supplying circuit 234 may apply the second well bias Vwell having a ground level to the well region 226. In the discharge period, the well bias supplying circuit 234 may float the well region 226.

In an example, the read operation may include a read period in which the read voltage having a positive level is applied to the selected local word lines WL0 to WLn, and may further include an equalizing period and a discharge period. In the read period, the well bias supplying circuit 234 may apply the first well bias Vwell having a ground level to the well region 226. In the equalizing period, the well bias supplying circuit 234 may apply the second well bias Vwell having a ground level to the well region 226. In the discharge period, the well bias supplying circuit 234 may float the well region 226.

In an example, the erase operation may include an erase period in which the erase voltage is applied to at least one of the local drain select line DSL, the local source select line SSL, the bit lines BL1 to BLk, and the source line SL, and may further include a discharge period. The well bias supplying circuit 234 may apply the first well bias Vwell having a ground level to the well region 226 in the erase period. The well bias supplying circuit 234 may apply the second well bias Vwell having a negative level to the well region 226 or float the well region 226 in the discharge period.

Figure 3A:
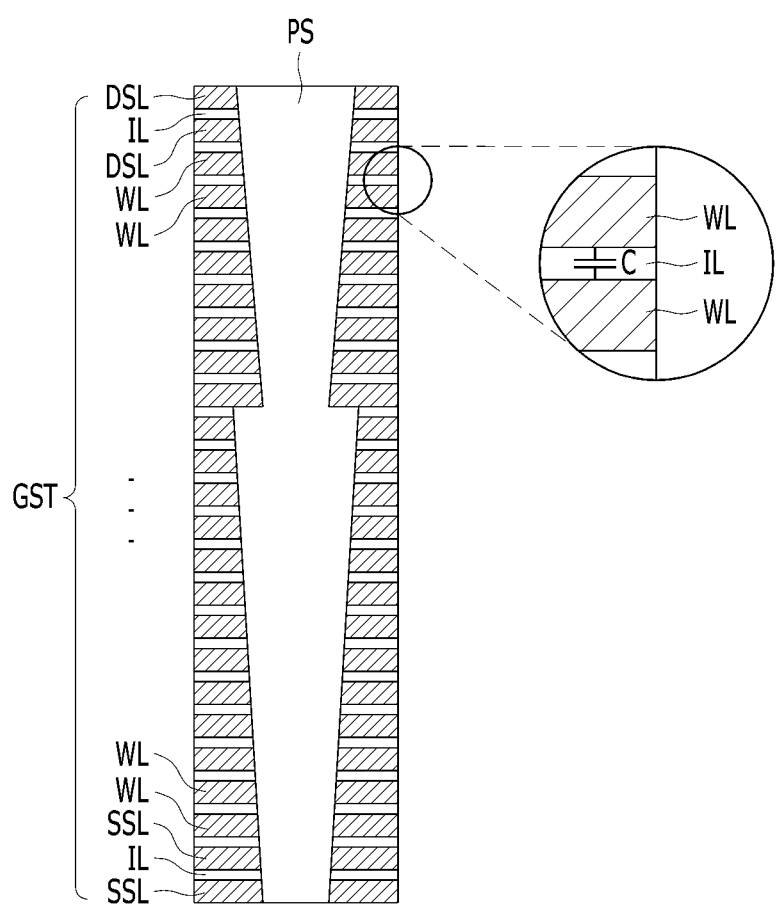
FIGS. 3A and 3B are diagrams illustrating the structure of a semiconductor device in accordance with an embodiment of the present disclosure.
Figure 3B:
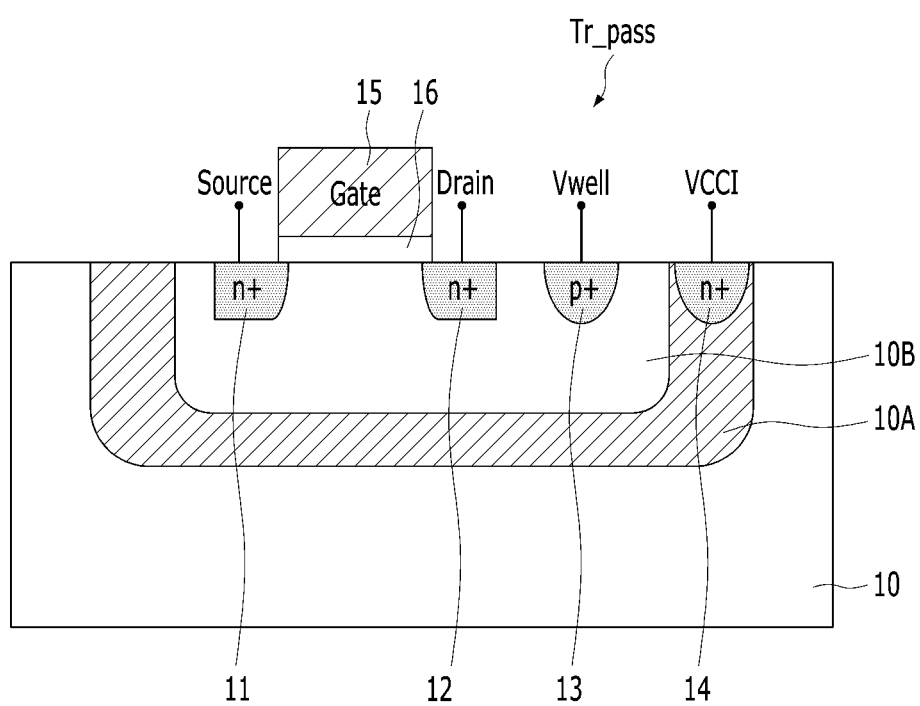

FIGS. 3A and 3B are diagrams illustrating the structure of a semiconductor device in accordance with an embodiment of the present disclosure. Hereinafter, the content overlapping with the previously described content may be omitted.

Referring to FIG. 3A, the semiconductor device may include a gate structure GST. The gate structure GST may be located on a lower structure such as a substrate and a peripheral circuit. The gate structure GST may include stacked local lines. The local lines may be a source select line SSL, a word line WL, or a drain select line DSL. The local lines DSL, WL, and SSL may be electrically separated by insulating layers IL.

In an example, the gate structure GST may have a structure in which at least one source select line SSL, a plurality of word lines WL, and at least one drain select line DSL are stacked. Among the word lines WL, at least one word line WL adjacent to the source select line SSL may be a source side dummy word line. Among the word lines WL, at least one word line WL adjacent to the drain select line DSL may be a drain side dummy word line.

The semiconductor device may include a penetration structure PS. The penetration structure PS may be located in the gate structure GST and may penetrate the local lines DSL, WL, and SSL in the stacking direction of the local lines DSL, WL, and SSL. In an example, the penetration structure PS may be a channel structure including a channel layer or an electrode structure including an electrode layer. A drain select transistor, a memory cell, or a source select transistor may be located in a region where the local lines DSL, WL, and SSL intersect the penetration structure PS. The drain select transistor, the memory cell, and the source select transistor sharing the penetration structure PS may constitute one memory string.

An operation voltage may be applied to the local lines DSL, WL, and SSL in order to perform a program, read, or erase operation. In such a case, voltages having different levels may be applied to the local lines DSL, WL, and SSL, and voltage levels of adjacent local lines may be changed by coupling or capacitance C among the stacked local lines DSL, WL, and SSL.

In an example, when the voltage level of an unselected word line WL is higher than the voltage level of a selected word line WL, the voltage level of the selected word line WL may drop to a negative level in the process of discharging the unselected word line WL. When the voltage of the word line WL is higher than the voltage levels of select lines SSL and DSL, the voltage level of the word line WL adjacent to the select lines SSL and DSL may drop to a negative level in the process of discharging the select lines SSL and DSL. The adjacent word line WL may be a real word line or a dummy word line. Since intervals among the stacked local lines DSL, WL, and SSL are reduced as the heights of the insulating layers IL are reduced for improving the degree of integration, voltage drop due to the capacitance C among the local lines DSL, WL, and SSL may be intensified.

Referring to FIG. 3B, the semiconductor device may include a pass transistor Tr_pass. The pass transistor Tr_pass may be located on a substrate 10 including a triple well. The triple well may be located in the substrate 10 and may include a first well region 10A and a second well region 10B including a different type of impurities. The substrate 10 may be a semiconductor substrate including p-type or n-type impurities. The first well region 10A may be located in the substrate 10 and may include a different type of impurities from those of the substrate 10. The second well region 10B may be located in the first well region 10A and may include a different type of impurities from those of the first well region 10A. In an example, the substrate 10 may include p-type impurities, the first well region 10A may include n-type impurities, and the second well region 10B may include p-type impurities. The first well region 10A may be a deep n-well and the second well region 10B may be a p-well.

The pass transistor Tr_pass may include a gate electrode 15, a gate insulating layer 16, a first junction 11, and a second junction 12. The gate electrode 15 may be located on the substrate 10, and a gate insulating layer 16 may be located between the gate electrode 15 and the substrate 10. The first junction 11 and the second junction 12 may be located in the second well region 10B. The first junction 11 and the second junction 12 may each include a different type of impurities from those of the second well region 10B. In an example, the first junction 11 and the second junction 12 may each include a high concentration of n-type impurities.

The first junction 11 may be a source region and the second junction 12 may be a drain region. For example, the first junction 11 may be connected to a global line and the second junction 12 may be connected to the local lines DSL, WL, and SSL. For another example, the first junction 11 may be connected to the local lines DSL, WL, and SSL and the second junction 12 may be connected to the global line.

The semiconductor device may further include a third junction 13 and a fourth junction 14. The third junction 13 may include the same type of high-concentration impurities as those of the second well region 10B. The third junction 13 may include a high concentration of p-type impurities. The third junction 13 may be connected to the well bias supplying circuit 234, and a well bias Vwell may be applied to the second well region 10B through the third junction 13.

The fourth junction 14 may be located in the first well region 10A and may include the same type of high-concentration impurities as those of the first well region 10A. The fourth junction 14 may include a high concentration of n-type impurities. A power supply voltage VCCI may be applied to the fourth junction 14.

The local lines DSL, WL, and SSL in FIG. 3A may be connected to the global line through the pass transistor Tr_pass in FIG. 3B. During the program operation, the read operation, or the erase operation, a voltage level of an adjacent local line may drop due to coupling in a process of discharging the local lines DSL, WL, and SSL.

In an example, when an unselected word line is discharged in a discharge period of the read operation, the voltage level of a selected word line may drop to a negative level due to coupling, and the voltage level of the second junction 12 may drop to a negative level. In such a case, when the second junction 12 has a negative level and the third junction 13 has a ground level, the voltage level of a body is greater than that of a source/drain region, which may cause PN turn-on. Therefore, during the program operation, the read operation, or the erase operation, it is possible to prevent or reduce abnormal turn-on of a pass transistor by adjusting the well bias Vwell according to periods.

Figure 4:
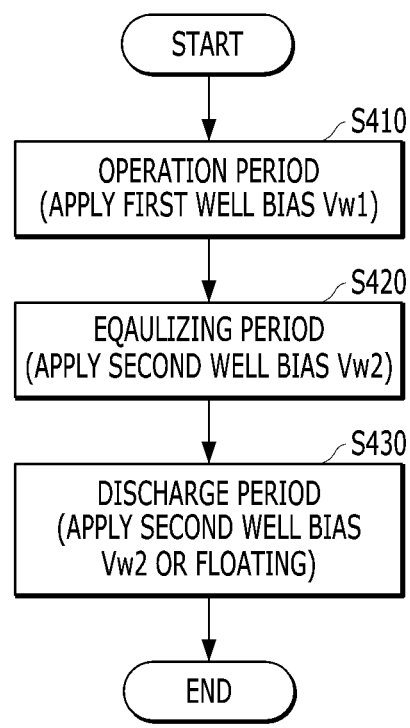
FIG. 4 is a flowchart for describing an operation of a semiconductor device in accordance with an embodiment of the present disclosure.

FIG. 4 is a flowchart for describing an operation of the semiconductor device in accordance with an embodiment of the present disclosure. The content overlapping with the previously described content may be omitted. The operation of the semiconductor device will be described below with reference to the circuit diagram of FIG. 2.

First, in the operation period, a first well bias Vw1 may be applied to the well region 226 of the pass transistor 224 (S410). In an example, the operation period may be a read period of a read operation or a verification period of a verification operation. In the operation period, the operation voltage supplying circuit 232 may apply a read voltage or a verification voltage to a selected word line and apply a pass voltage to an unselected word line. The well bias supplying circuit 234 may apply the first well bias Vw1 to the well region 226.

In the equalizing period, the voltage level of the selected word line and the voltage level of the unselected word line may be equalized (S420). The voltage level of the unselected word line may be maintained, and the voltage level of the selected word line may rise. The well bias supplying circuit 234 may apply a second well bias Vw2 to the well region 226.

In the discharge period, the unselected word line may be discharged (S430). The voltage level of the unselected word line and the voltage level of the selected word line may drop. In such a case, the voltage of the word line selected by coupling may temporarily drop to a negative level. The well bias supplying circuit 234 may apply the second well bias Vw2 to the well region 226 or float the well region 226.

In an example, when the read voltage or the verification voltage has a negative level, the well bias supplying circuit 234 may apply the first well bias Vw1 having a first negative level to the well region 226 in the operation period. Subsequently, the well bias supplying circuit 234 may apply the second well bias Vw2 having a second negative level greater than the first negative level to the well region 226 in the equalizing period and the discharge period.

In an example, when the read voltage or the verification voltage has a positive level, the well bias supplying circuit 234 may apply the first well bias Vw1 having a ground level to the well region 226 in the operation period. Subsequently, the well bias supplying circuit 234 may apply the second well bias Vw2 having a negative level to the well region 226 in the equalizing period and the discharge period.

In an example, when the read voltage or the verification voltage has a negative level, the well bias supplying circuit 234 may apply the first well bias Vw1 having a negative level to the well region 226 in the operation period. Subsequently, the well bias supplying circuit 234 may apply the second well bias Vw2 having a ground level to the well region 226 in the equalizing period, and may float the well region 226 in the discharge period.

In an example, when the read voltage or the verification voltage has a positive level, the well bias supplying circuit 234 may apply the well bias Vwell having a ground level to the well region 226 in the operation period and the equalizing period, and float the well region 226 in the discharge period.

According to the method described above, the voltage level of the well region 226 may be adjusted by the well bias supplying circuit 234. Accordingly, even though the voltage level of a selected word line drops to a negative level in the discharge period, it is possible to prevent or reduce the PN turn-on of the pass transistor 224.

Figure 5:
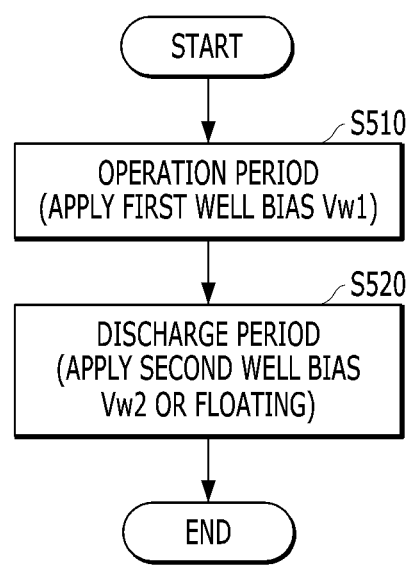
FIG. 5 is a flowchart for describing an operation of a semiconductor device in accordance with an embodiment of the present disclosure.

FIG. 5 is a flowchart for describing an operation of the semiconductor device in accordance with an embodiment of the present disclosure. The content overlapping with the previously described content may be omitted. The operation of the semiconductor device will be described below with reference to the circuit diagram of FIG. 2.

First, in an operation period, the first well bias Vw1 may be applied to the well region 226 of the pass transistor 224 (S510). In an example, the operation period may be an erase period of an erase operation. The erase operation may be performed using a gate induced drain leakage (GIDL) method, and may be performed by supplying memory cells with holes generated in a drain select transistor or a source select transistor. In the operation period, the operation voltage supplying circuit 232 may apply an erase voltage to at least one of the bit line BL and the source line SL. In such a case, the drain select line DSL may be coupled to the bit line BL or its voltage level may rise by a voltage applied from the operation voltage supplying circuit 232. The source select line SSL may be coupled to the source line SL or its voltage level may rise by a voltage applied from the operation voltage supplying circuit 232. Accordingly, the voltage level of at least one of the drain select line DSL and the source select line SSL may rise to a level equal to the erase voltage (Vers) or a level lower than the erase voltage (Vers-ΔV). Here, ΔV may be a gate induced drain leakage (GIDL) voltage Vgidl for generating a GIDL current. The operation voltage supplying circuit 232 may apply a ground voltage to the word lines WL0 to WLn. The well bias supplying circuit 234 may apply the first well bias Vw1 having a ground level to the well region 226.

In a discharge period, a select line to which the erase voltage is applied may be discharged (S520). The voltage level of the select line may drop to the ground level. In such a case, a voltage level of a word line adjacent to the select line may temporarily drop to a negative level due to coupling. The well bias supplying circuit 234 may apply the second well bias Vw2 having a negative level to the well region 226 or float the well region 226.

According to the method described above, even though the voltage level of a word line adjacent to a select line drops to a negative level in the discharge period, it is possible to prevent or reduce the PN turn-on of the pass transistor 224.

Figure 6:
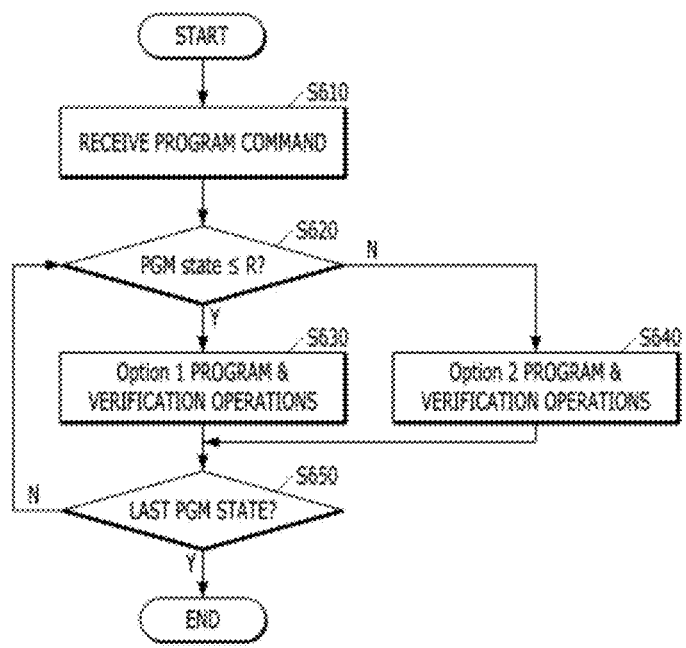
FIG. 6 is a flowchart for describing an operating method of a semiconductor device in accordance with an embodiment of the present disclosure.

FIG. 6 is a flowchart illustrating an operating method of the semiconductor device in accordance with an embodiment of the present disclosure. Hereinafter, the content overlapping with the previously described content may be omitted.

First, the semiconductor device may receive a program command (S610). In an example, the semiconductor device may receive a command CMD and an address ADD from a controller. Subsequently, the semiconductor device may perform a program operation on a page selected based on the address ADD. A target program state of each of the memory cells included in the selected page may be one of first to $x^{th}$ program states PV1 to PVx. Here, x may be an integer equal to or greater than 2. The program operation may be performed using an ISPP method including a plurality of program loops, and each loop may include a program pulse and a verification pulse. In an example, after a first program loop for the first program state PV1 is performed, a second program loop for the second program state PV2 may be performed. Memory cells programmed to a target level by the first program loop may be inhibited from being programmed in the second program loop.

When performing the program operation, the semiconductor device may check whether a program (PGM) state to be programmed at the current stage is equal to or less than a reference value R (S620). The reference value R may be determined in consideration of a difference between a voltage level of a selected word line and a voltage level of an unselected word line and a degree of voltage drop due to coupling.

When a memory cell is programmed in a multi-level program state, levels of a read voltage and a pass voltage used for a verification operation may be different according to a program state. In an example, in the case of a program state having a relatively low threshold voltage, a verification voltage applied to a selected word line may have a relatively low voltage level. Since the voltage level of the selected word line is low, when an unselected word line is discharged, the voltage of the selected word line may drop to a negative level due to coupling and a pass transistor may be abnormally turned on. On the other hand, in a PGM state having a relatively high threshold voltage, the verification voltage applied to the selected word line is relatively high. Therefore, even though the voltage of the selected word line drops due to coupling, the voltage of the selected word line might not drop to a negative level. Accordingly, among program states in which the pass transistor may be abnormally turned on, a program state having the highest threshold voltage may be set as the reference value R. In an example, the reference value R may be PVy, and y may be an integer greater than 1 and less than x.

When the PGM state to be programmed at the current stage is equal to or less than the reference value R (S620, Y), program and verification operations according to a first option may be performed (S630). According to the first option, a well bias having a negative level may be applied to a well region or the well region may be floated in the discharge period. Accordingly, even though the voltage level of the selected word line drops to a negative level, it is possible to prevent or reduce abnormal turn-on of the pass transistor.

When the PGM state to be programmed at the current stage exceeds the reference value R (S620, N), program and verification operations according to a second option may be performed (S640). According to the second option, a well bias having a ground level may be applied to the well region in the discharge period. Since the voltage level of the selected word line does not drop to a negative level in the discharge period, the pass transistor might not be abnormally turned on even though the well region 226 has a ground level.

Subsequently, the semiconductor device may check whether a last program state has been completed (S650). When the last program state has been completed, the program operation may end. When the last program state has not been completed, the semiconductor device may check whether a next program state to be programmed is equal to or less than the reference value R (S620).

According to the operating method described above, a well bias control method may be selected according to a program state. Accordingly, the well bias control method may be changed according to a program loop. In an example, in a TLC program method, the reference value R may be the third program state PV3. When the PGM state to be programmed is equal to or less than PV3, program and verification operations may be performed according to the first option. When the PGM state to be programmed is equal to or greater than PV4, program and verification operations may be performed according to the second option.

An option may also be selected based on a completed program state. When the completed program state is equal to or less than the reference value R, the program and verification operations may be performed according to the first option, whereas when the completed program state exceeds the reference value R, the program and verification operations may be performed according to the second option. When the last program state has not been completed, the semiconductor device may check whether the completed program state is equal to or less than the reference value R.

Figure 7:
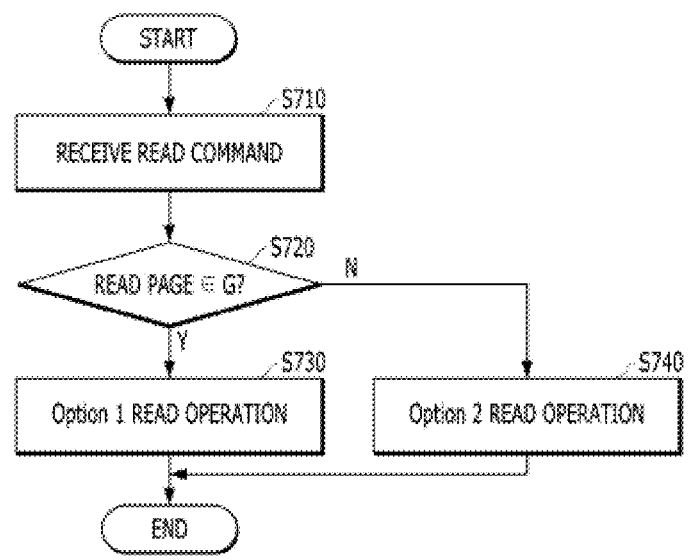
FIG. 7 is a flowchart for describing an operating method of a semiconductor device in accordance with an embodiment of the present disclosure.

FIG. 7 is a flowchart illustrating an operating method of the semiconductor device in accordance with an embodiment of the present disclosure. Hereinafter, the content overlapping with the previously described content may be omitted.

First, the semiconductor device may receive a read command (S710). In an example, the semiconductor device may receive a command CMD and an address ADD from the controller. Subsequently, the semiconductor device may check whether a page selected through the address ADD belongs to a reference group G (S720). The reference group G may be determined in consideration of a voltage drop due to coupling of word lines in a discharge period. Pages in which the voltage level of a selected word line may drop to a negative level in the discharge period may belong to the reference group G.

When a page to be read belongs to the reference group G (S720, Y), a read operation according to a first option may be performed (S730). According to the first option, a well bias having a negative level may be applied to a well region or the well region may be floated in the discharge period. Accordingly, even though the voltage level of the selected word line drops to a negative level, it is possible to prevent or reduce abnormal turn-on of a pass transistor.

When the page to be read does not belong to the reference group G (S720, N), a read operation according to a second option may be performed (S740). According to the second option, a well bias having a ground level may be applied to the well region in the discharge period. Since the voltage level of the selected word line does not drop to a negative level in the discharge period, the pass transistor might not be abnormally turned on even though the well region 226 has a ground level.

According to the operating method described above, a well bias control method may be selected according to a page to be read. Accordingly, the well bias control method may be changed for each page to be read.

Figure 8:
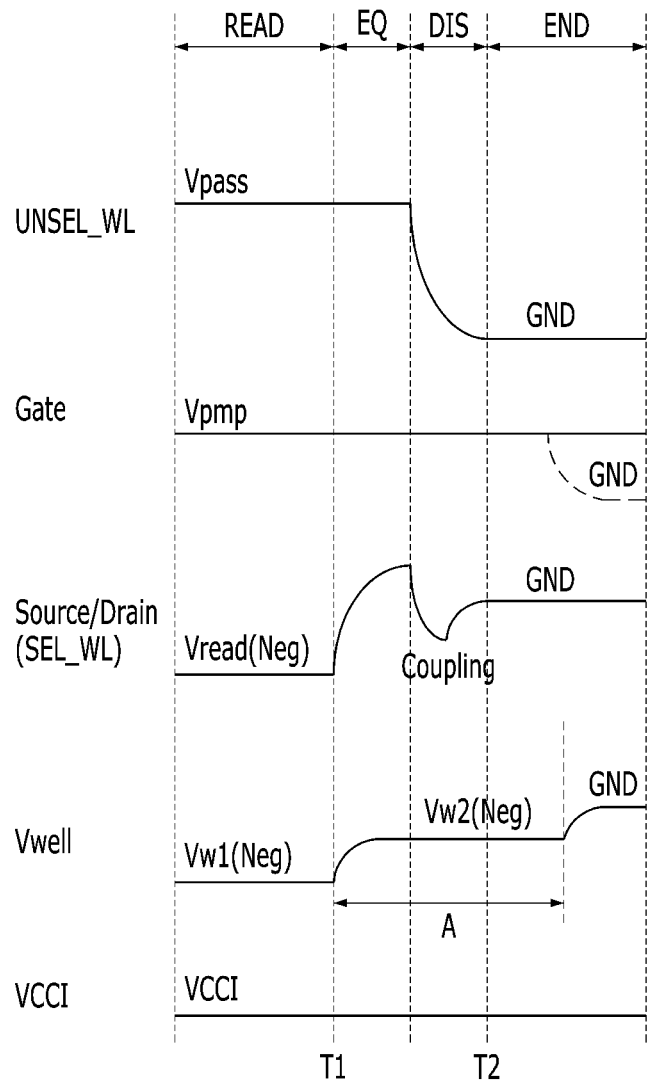
FIG. 8 is a timing diagram for describing an operating method of a semiconductor device in accordance with an embodiment of the present disclosure.

FIG. 8 is a timing diagram for describing an operating method of the semiconductor device in accordance with an embodiment of the present disclosure. The content overlapping with the previously described content may be omitted. The operation method will be described below based on the structure of the pass transistor Tr_pass described with reference to FIG. 3B.

Referring to FIG. 8, the read operation may include a read period READ, an equalizing period EQ, and a discharge period DIS, and may further include an end period END. The read operation may be a verification operation, and the read period READ may be a verification period.

In the read period READ, a read voltage Vread may be applied to a selected word line SEL_WL. The read voltage Vread may be set to a level capable of turning on or off a memory cell according to a program state. When reading a program state having a threshold voltage at a negative level, the operation voltage supplying circuit 232 may apply the read voltage Vread having a negative level to a global word line connected to the selected word line SEL_WL.

A pass voltage Vpass may be applied to an unselected word line UNSEL_WL. The pass voltage Vpass may be set to a level capable of turning on a memory cell regardless of a program state. The operation voltage supplying circuit 232 may apply the pass voltage Vpass having a positive level to a global word line connected to the unselected word line UNSEL_WL.

An operation voltage may be transferred from the global word line to a local word line by turning on the pass transistor Tr_pass by applying a pump voltage Vpmp to a gate electrode Gate of the pass transistor Tr_pass. The voltage level of the pump voltage Vpmp may be set to a level capable of transferring the voltage level of the global word line to the local word line as is. Accordingly, the read voltage Vread having a negative level may be transferred to the selected word line SEL_WL, and the pass voltage Vpass may be transferred to the unselected word line UNSEL_WL.

The well bias supplying circuit 234 may apply a well bias Vwell to the third junction 13, and the well bias Vwell may be transferred to the second well region 10B through the third junction 13. When the read voltage Vread has a negative level, the well bias supplying circuit 234 may apply the first well bias Vw1 having a first negative level to the second well region 10B. The well bias supplying circuit 234 may apply a power supply voltage VCCI to the fourth junction 14. The power supply voltage VCCI may be transferred to the first well region 10A through the fourth junction 14.

When a selected memory cell has a threshold voltage greater than the read voltage Vread, the selected memory cell may be turned off. When the selected memory cell has a threshold voltage less than the read voltage Vread, the selected memory cell may be turned on. All unselected memory cells may be turned on. Accordingly, data stored in the selected memory cell may be read.

In the equalizing period EQ, the voltage level of the unselected word line UNSEL_WL and the voltage level of the selected word line SEL_WL may be equalized. In an example, the unselected word line UNSEL_WL may maintain the voltage level of the pass voltage Vpass, and the voltage level of the selected word line SEL_WL may rise.

The well bias supplying circuit 234 may apply a second well bias Vw2 having a second negative level greater than the first negative level to the third junction 13. The second well bias Vw2 may be transferred to the second well region 10B through the third junction 13. The second negative level may have an absolute value less than an absolute value of the first negative level.

In the discharge period DIS, the unselected word line UNSEL_WL may be discharged. The voltage level of the unselected word line UNSEL_WL may drop to a ground level GND. The voltage level of the selected word line SEL_WL may drop to the ground level GND. At this time, the voltage level of the selected word line SEL_WL may temporarily drop to a negative level due to coupling with the unselected word line UNSEL_WL and then rise to the ground level GND.

In the end period END, the voltage levels of the unselected word line UNSEL_WL and the selected word line SEL_WL may each be the ground level GND. The voltage level of the second well region 10B may be changed to the ground level GND. When the read operation is ended, the ground voltage GND may be applied to the gate electrode Gate. When another operation continues, the pump voltage Vpmp may be applied to the gate electrode Gate. For example, when a program operation is performed using an incremental step pulse program (ISPP) method including a plurality of program loops, a next program pulse may be applied after a verification period. In such a case, the pump voltage Vpmp may be applied to the gate electrode Gate.

According to the operating method described above, as the voltage level of the selected word line SEL_WL temporarily drops to a negative level in the discharge period DIS, the second junction 12 of the pass transistor Tr_pass may temporarily have a negative level. In such a case, since the second well region 10B has a second negative level, the voltage level of the body may be less than that of the source/drain region. Accordingly, it is possible to prevent or reduce abnormal turn-on of the pass transistor Tr_pass.

The well bias supplying circuit 234 may apply the second well bias Vw2 having a second negative level in at least a part of the equalizing period EQ and the discharge period DIS. The start time point and the end time point of supplying of the second well bias Vw2 may be changed. The second well bias Vw2 may be applied from a first time point T1 when the equalizing period EQ starts, or may be applied from an arbitrary time point after the first time point T1. The supplying of the second well bias Vw2 may end at a second time point T2 when the discharge period DIS is ended. Alternatively, the supplying of the second well bias Vw2 may end at an arbitrary time point after the second time point T2.

Figure 9:
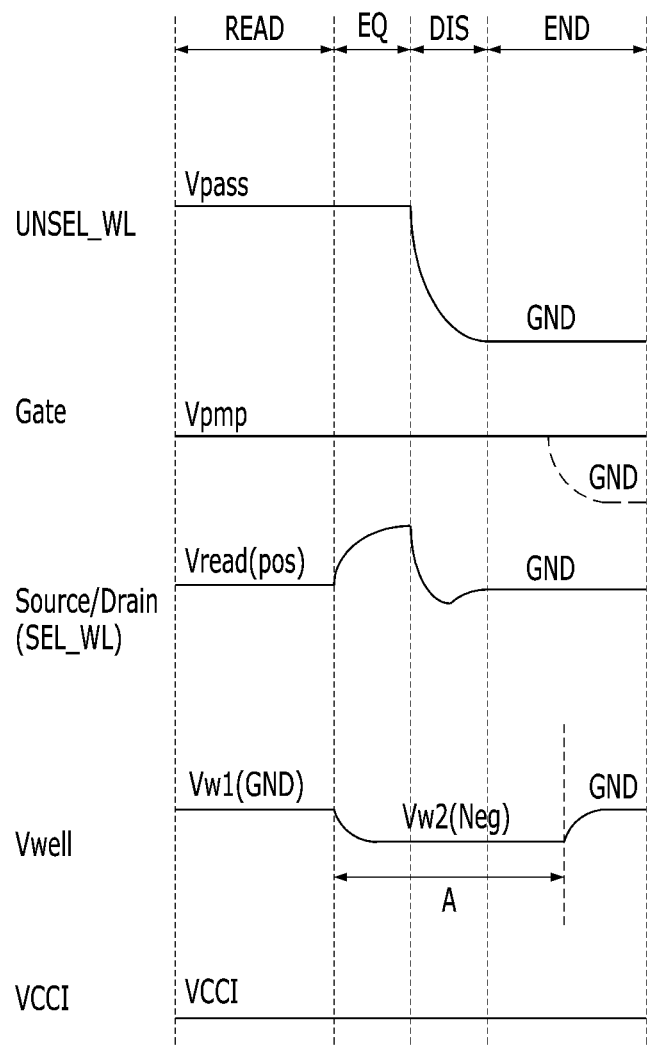
FIG. 9 is a timing diagram for describing an operating method of a semiconductor device in accordance with an embodiment of the present disclosure.

FIG. 9 is a timing diagram for describing an operating method of the semiconductor device in accordance with an embodiment of the present disclosure. The content overlapping with the previously described content may be omitted. The operation method will be described below based on the structure of the pass transistor Tr_pass described with reference to FIG. 3B.

Referring to FIG. 9, the read operation may include the read period READ, the equalizing period EQ, and the discharge period DIS, and may further include the end period END.

In the read period READ, the read voltage Vread may be applied to the selected word line SEL_WL. When reading a program state having a threshold voltage at a positive level, the operation voltage supplying circuit 232 may apply the read voltage Vread having a positive level to the global word line connected to the selected word line SEL_WL.

The pass voltage Vpass may be applied to the unselected word line UNSEL_WL. The operation voltage supplying circuit 232 may apply the pass voltage Vpass having a positive level to the global word line connected to the unselected word line UNSEL_WL.

An operation voltage may be transferred from the global word line to the local word line by turning on the pass transistor Tr_pass by applying the pump voltage Vpmp to the gate electrode Gate of the pass transistor Tr_pass. The read voltage Vread having a positive level may be transferred to the selected word line SEL_WL, and the pass voltage Vpass having a positive level may be transferred to the unselected word line UNSEL_WL.

The well bias supplying circuit 234 may apply the well bias Vwell to the third junction 13. When the read voltage Vread has a positive level, the well bias supplying circuit 234 may apply the first well bias Vw1 having the ground level GND to the second well region 10B through the third junction 13. The well bias supplying circuit 234 may apply the power supply voltage VCCI to the fourth junction 14.

In the equalizing period EQ, the voltage level of the unselected word line UNSEL_WL and the voltage level of the selected word line SEL_WL may be equalized. In an example, the unselected word line UNSEL_WL may maintain the voltage level of the pass voltage Vpass, and the voltage level of the selected word line SEL_WL may rise.

The well bias supplying circuit 234 may apply the second well bias Vw2 having a negative level to the third junction 13.

In the discharge period DIS, the unselected word line UNSEL_WL may be discharged. The voltage level of the unselected word line UNSEL_WL may drop to the ground level GND. The voltage level of the selected word line SEL_WL may drop to the ground level GND. At this time, the voltage level of the selected word line SEL_WL may temporarily drop to a negative level due to coupling with the unselected word line UNSEL_WL and then rise to the ground level GND.

In the end period END, the voltage levels of the unselected word line UNSEL_WL and the selected word line SEL_WL may each be the ground level GND. The voltage level of the second well region 10B may be changed to the ground level GND. When the read operation is ended, the ground voltage GND may be applied to the gate electrode Gate. When another operation continues, the pump voltage Vpmp may be applied to the gate electrode Gate. For example, when a program operation is performed using an ISPP method, a next program pulse may be applied after a verification period, and the pump voltage Vpmp may be applied to the gate electrode Gate.

According to the operating method described above, as the voltage level of the selected word line SEL_WL temporarily drops to a negative level in the discharge period DIS, the second junction 12 of the pass transistor Tr_pass may temporarily have a negative level. In such a case, since the second well bias Vw2 having a negative level is applied to the second well region 10B, it is possible to prevent or reduce abnormal turn-on of the pass transistor Tr_pass. The well bias supplying circuit 234 may apply the second well bias Vw2 having a negative level to the third junction 13 in the equalizing period EQ and the discharge period DIS, and the start time point and the end time point of supplying of the second well bias Vw2 may be changed.

Figure 10:
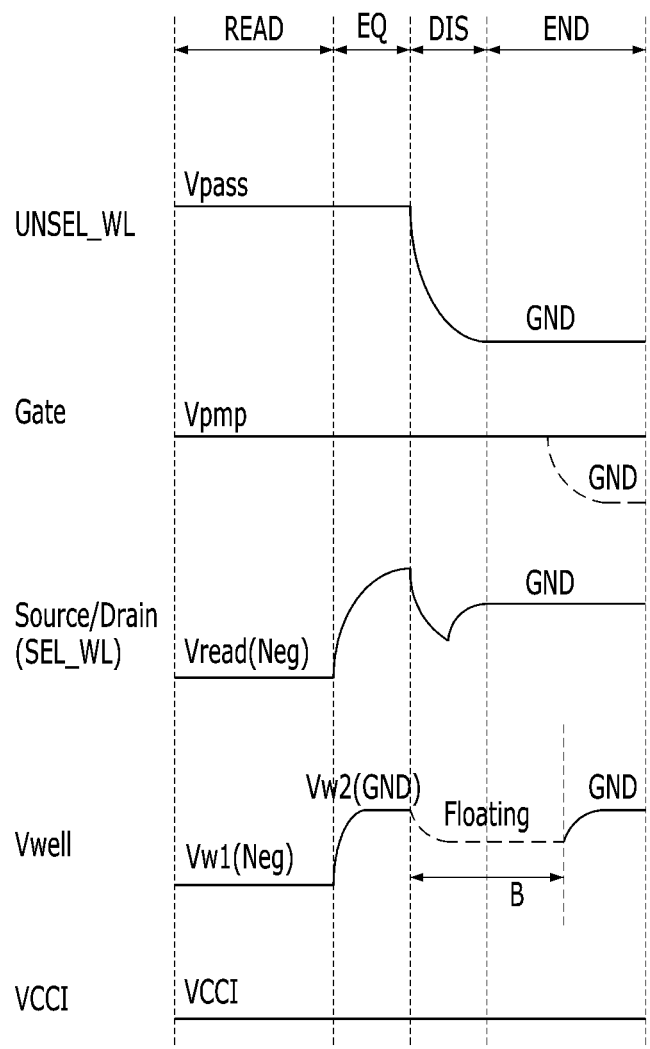
FIG. 10 is a timing diagram for describing an operating method of a semiconductor device in accordance with an embodiment of the present disclosure.

FIG. 10 is a timing diagram for describing an operating method of the semiconductor device in accordance with an embodiment of the present disclosure. The content overlapping with the previously described content may be omitted. The operation method will be described below based on the structure of the pass transistor Tr_pass described with reference to FIG. 3B.

Referring to FIG. 10, the read operation may include the read period READ, the equalizing period EQ, and the discharge period DIS, and may further include the end period END.

In the read period READ, the read voltage Vread may be applied to the selected word line SEL_WL. When reading a program state having a threshold voltage at a negative level, the operation voltage supplying circuit 232 may apply the read voltage Vread having a negative level to the global word line connected to the selected word line SEL_WL.

The pass voltage Vpass may be applied to the unselected word line UNSEL_WL. The operation voltage supplying circuit 232 may apply the pass voltage Vpass having a positive level to the global word line connected to the unselected word line UNSEL_WL.

An operation voltage may be transferred from the global word line to the local word line by turning on the pass transistor Tr_pass by applying the pump voltage Vpmp to the gate electrode Gate of the pass transistor Tr_pass. The read voltage Vread having a negative level may be transferred to the selected word line SEL_WL, and the pass voltage Vpass having a positive level may be transferred to the unselected word line UNSEL_WL.

The well bias supplying circuit 234 may apply the well bias Vwell to the third junction 13. When the read voltage Vread has a negative level, the well bias supplying circuit 234 may apply the first well bias Vw1 having a negative level to the second well region 10B through the third junction 13. The well bias supplying circuit 234 may apply the power supply voltage VCCI to the fourth junction 14.

In the equalizing period EQ, the voltage level of the unselected word line UNSEL_WL and the voltage level of the selected word line SEL_WL may be equalized. In an example, the unselected word line UNSEL_WL may maintain the voltage level of the pass voltage Vpass, and the voltage level of the selected word line SEL_WL may rise.

The well bias supplying circuit 234 may apply the second well bias Vw2 having the ground level GND to the third junction 13.

In the discharge period DIS, the unselected word line UNSEL_WL may be discharged. The voltage level of the unselected word line UNSEL_WL may drop to the ground level GND. The voltage level of the selected word line SEL_WL may drop to the ground level GND. At this time, the voltage level of the selected word line SEL_WL may temporarily drop to a negative level due to coupling with the unselected word line UNSEL_WL and then rise to the ground level GND.

The well bias supplying circuit 234 may float the third junction 13. Accordingly, the second well region 10B may be floated. The voltage level of the floating second well region 10B may drop to a negative level.

In the end period END, the voltage levels of the unselected word line UNSEL_WL and the selected word line SEL_WL may each be the ground level GND. The voltage level of the second well region 10B may be changed to the ground level GND. When the read operation is ended, the ground voltage GND may be applied to the gate electrode Gate. When another operation continues, the pump voltage Vpmp may be applied to the gate electrode Gate. For example, when a program operation is performed using an ISPP method, a next program pulse may be applied after a verification period, and the pump voltage Vpmp may be applied to the gate electrode Gate.

According to the operating method described above, as the voltage level of the selected word line SEL_WL temporarily drops to a negative level in the discharge period DIS, the second junction 12 of the pass transistor Tr_pass may temporarily have a negative level. In such a case, the voltage level of the second well region 10B having a floating state may drop to a negative level, which makes it possible to prevent or reduce abnormal turn-on of the pass transistor Tr_pass. The well bias supplying circuit 234 may float the second well region 10B in the discharge period DIS, and the start time point and the end time point of the floating may be changed.

Figure 11:
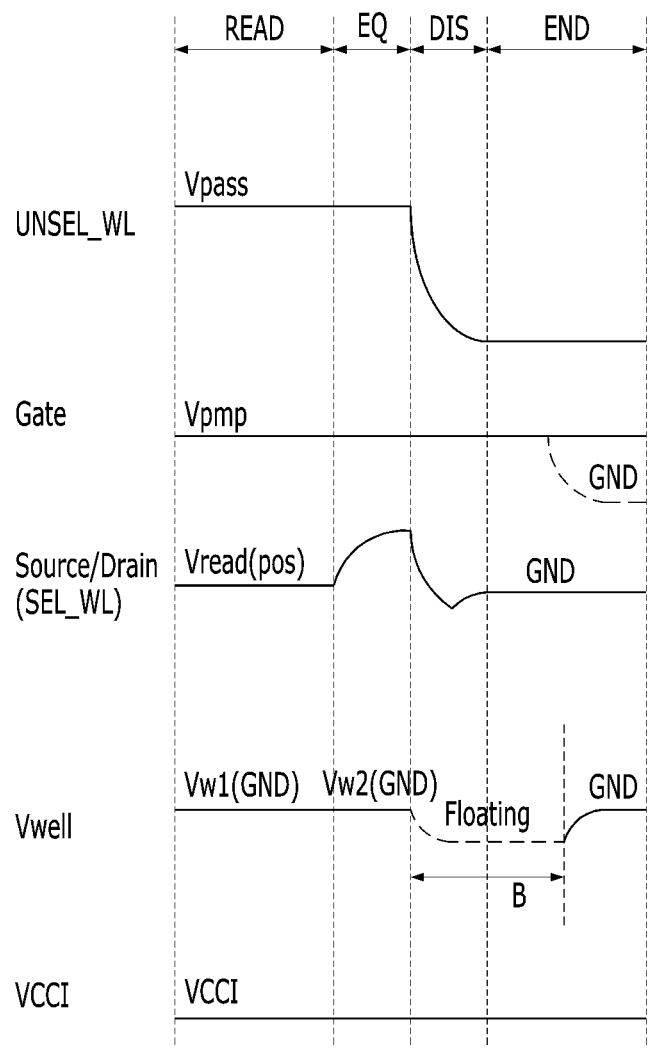
FIG. 11 is a timing diagram for describing an operating method of a semiconductor device in accordance with an embodiment of the present disclosure.

FIG. 11 is a timing diagram for describing an operating method of the semiconductor device in accordance with an embodiment of the present disclosure. The content overlapping with the previously described content may be omitted. The operation method will be described below based on the structure of the pass transistor Tr_pass described with reference to FIG. 3B.

Referring to FIG. 11, the read operation may include the read period READ, the equalizing period EQ, and the discharge period DIS, and may further include the end period END.

In the read period READ, the read voltage Vread may be applied to the selected word line SEL_WL. When reading a program state having a threshold voltage at a positive level, the operation voltage supplying circuit 232 may apply the read voltage Vread having a positive level to the global word line connected to the selected word line SEL_WL.

The pass voltage Vpass may be applied to the unselected word line UNSEL_WL. The operation voltage supplying circuit 232 may apply the pass voltage Vpass having a positive level to the global word line connected to the unselected word line UNSEL_WL.

An operation voltage may be transferred from the global word line to the local word line by turning on the pass transistor Tr_pass by applying the pump voltage Vpmp to the gate electrode Gate of the pass transistor Tr_pass. The read voltage Vread having a positive level may be transferred to the selected word line SEL_WL, and the pass voltage Vpass having a positive level may be transferred to the unselected word line UNSEL_WL.

The well bias supplying circuit 234 may apply the well bias Vwell to the third junction 13. When the read voltage Vread has a positive level, the well bias supplying circuit 234 may apply the first well bias Vw1 having the ground level GND to the second well region 10B through the third junction 13. The well bias supplying circuit 234 may apply the power supply voltage VCCI to the fourth junction 14.

In the equalizing period EQ, the voltage level of the unselected word line UNSEL_WL and the voltage level of the selected word line SEL_WL may be equalized. In an example, the unselected word line UNSEL_WL may maintain the voltage level of the pass voltage Vpass, and the voltage level of the selected word line SEL_WL may rise. The well bias supplying circuit 234 may apply the second well bias Vw2 having the ground level GND to the second well region 10B.

In the discharge period DIS, the unselected word line UNSEL_WL may be discharged. The voltage level of the unselected word line UNSEL_WL may drop to the ground level GND. The voltage level of the selected word line SEL_WL may drop to the ground level GND. At this time, the voltage level of the selected word line SEL_WL may temporarily drop to a negative level due to coupling with the unselected word line UNSEL_WL and then rise to the ground level GND.

The well bias supplying circuit 234 may float the third junction 13. Accordingly, the second well region 10B may be floated. The voltage level of the floating second well region 10B may drop to a negative level.

In the end period END, the voltage levels of the unselected word line UNSEL_WL and the selected word line SEL_WL may each have the ground level GND. The voltage level of the second well region 10B may be changed to the ground level GND. When the read operation is ended, the ground voltage GND may be applied to the gate electrode Gate. When another operation continues, the pump voltage Vpmp may be applied to the gate electrode Gate. For example, when a program operation is performed using an ISPP method, a next program pulse may be applied after a verification period, and the pump voltage Vpmp may be applied to the gate electrode Gate.

According to the operating method described above, as the voltage level of the selected word line SEL_WL temporarily drops to a negative level in the discharge period DIS, the second junction 12 of the pass transistor Tr_pass may temporarily have a negative level. In such a case, the voltage level of the second well region 10B having a floating state may drop to a negative level, which makes it possible to prevent or reduce abnormal turn-on of the pass transistor Tr_pass. The well bias supplying circuit 234 may float the second well region 10B in the discharge period DIS, and the start time point and the end time point of the floating may be changed.

Figure 12:
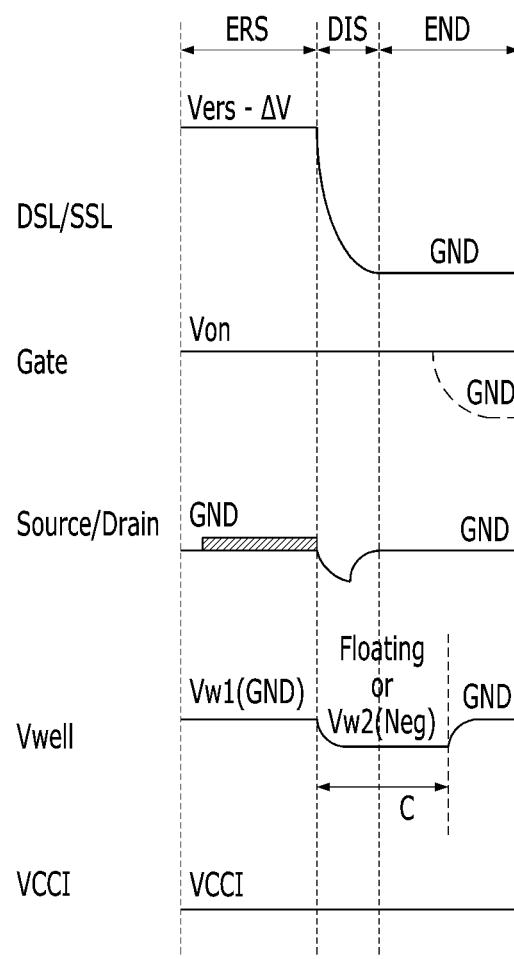
FIG. 12 is a timing diagram for describing an operating method of a semiconductor device in accordance with an embodiment of the present disclosure.

FIG. 12 is a timing diagram for describing an operating method of the semiconductor device in accordance with an embodiment of the present disclosure. The content overlapping with the previously described content may be omitted. The operation method will be described below based on the structure of the pass transistor Tr_pass described with reference to FIG. 3B.

Referring to FIG. 12, the erase operation may include an erase period ERS and the discharge period DIS, and may further include the end period END.

In the erase period ERS, the erase voltage Vers may be applied to at least one of the bit line BL and the source line SL. In such a case, the drain select line DSL may be coupled to the bit line BL or the source select line SSL may be coupled to the source line SL, so that the voltage level of the drain select line DSL or the source select line SSL may rise. Alternatively, the operation voltage supplying circuit 232 may apply a voltage having a lower level than the erase voltage Vers to at least one global select line of a global drain select line connected to the drain select line DSL of a selected memory block and a global source select line connected to the source select line SSL of the selected memory block. Accordingly, the voltage level of at least one of the drain select line DSL and the source select line SSL may rise to a level (Vers-AV) lower than the erase voltage Vers. Here, AV may be a gate induced drain leakage (GIDL) voltage Vgidl for generating a GIDL current.

The ground voltage may be applied to word lines. The operation voltage supplying circuit 232 may apply the ground voltage to global word lines connected to word lines of the selected memory block. The operation voltage supplying circuit 232 may apply a voltage having a positive level to the word lines in a part of the erase period ERS, and accordingly, the degree of erasing of the memory cells may be adjusted.

An operation voltage may be transferred from the global word line to the local word line by turning on the pass transistor Tr_pass by applying a turn-on voltage Von to the gate electrode Gate of the pass transistor Tr_pass. The voltage level of the turn-on voltage Von may be set to a level capable of transferring the voltage level of the global word line to at least some local word lines, and may have a level equal to or lower than the pump voltage Vpmp. Accordingly, the voltage Vers-AV may be transferred to the drain select line DSL and the source select line SSL, and the ground voltage may be transferred to the word lines WL.

The well bias supplying circuit 234 may apply the well bias Vwell to the third junction 13. The well bias supplying circuit 234 may apply the first well bias Vw1 having the ground level GND to the second well region 10B through the third junction 13. The well bias supplying circuit 234 may apply the power supply voltage VCCI to the fourth junction 14.

In the discharge period DIS, the drain select line DSL and the source select line SSL may be discharged. The voltage levels of the drain select line DSL and the source select line SSL may each drop to the ground level GND. The voltage levels of the word lines WL may each drop to the ground level GND. At this time, the voltage level of the word line WL adjacent to the drain select line DSL and the source select line SSL among the word lines WL may temporarily drop to a negative level due to coupling and then rise to the ground level GND.

The well bias supplying circuit 234 may apply the second well bias Vw2 having a negative level to the third junction 13 or float the third junction 13. Accordingly, the voltage level of the second well region 10B may drop to a negative level or the second well region 10B may be floated. The voltage level of the floating second well region 10B may drop to a negative level.

In the end period END, the voltage levels of the drain select line DSL and the source select line SSL may each be the ground level GND. The voltage level of the second well region 10B may be changed to the ground level GND. When the erase operation is ended, the ground voltage may be applied to the gate electrode Gate. When another operation continues, the turn-on voltage Von may be applied to the gate electrode Gate. For example, the verification operation may follow after the erase period ERS is ended.

According to the operating method described above, as the voltage level of the word line WL temporarily drops to a negative level in the discharge period DIS, the second junction 12 of the pass transistor Tr_pass may temporarily have a negative level. In such a case, since the second well bias Vw2 having a negative level is applied to the second well region 10B or the second well region 10B has a floating state, it is possible to prevent or reduce abnormal turn-on of the pass transistor Tr_pass. The start time point and the end time point of supplying the second well bias Vw2 may be changed and the start time point and the end time point of the floating may be changed.

Although embodiments according to the technical idea of the present disclosure have been described above with reference to the accompanying drawings, this is only for describing the embodiments according to the concept of the present disclosure, and the present disclosure is not limited to the above embodiments. Various types of substitutions, modifications, and changes for the embodiments may be made by those skilled in the art, to which the present disclosure pertains, without departing from the technical idea of the present disclosure defined in the following claims, and it should be construed that these substitutions, modifications, and changes belong to the scope of the present disclosure. Furthermore, the embodiments may be combined to form additional embodiments.

What is claimed is:
1. A semiconductor device comprising:
a cell array including memory cells connected to local word lines;
an operation voltage supplying circuit that applies a read voltage or a pass voltage to global word lines; and
a well bias supplying circuit that, during a read operation, applies a well bias having a negative level to a well region of a pass transistor connected to a selected local word line, in a discharge period in which unselected local word lines are discharged,
wherein the well bias supplying circuit applies the well bias having a negative level to the well region in an equalizing period in which a voltage level of the selected local word line and a voltage level of each of the unselected local word lines are equalized.

2. The semiconductor device of claim 1, wherein the pass transistor is located on a substrate including a triple well, and the triple well includes an n-type first well region located in a p-type substrate and a p-type second well region located in the first well region.

3. The semiconductor device of claim 2, wherein the pass transistor includes an n-type first junction and an n-type second junction located in the second well region, the first junction is connected to a global word line, and the second junction is connected to a local word line.

4. The semiconductor device of claim 2, wherein the substrate includes a p-type third junction located in the second well region, and the well bias supplying circuit applies the well bias to the second well region through the third junction.

5. The semiconductor device of claim 1, wherein, before the discharge period, the operation voltage supplying circuit applies the read voltage to a global word line connected to the selected local word line and applies the pass voltage to global word lines connected to the unselected local word lines.

6. The semiconductor device of claim 5, wherein the well bias supplying circuit applies, to the well region, the well bias having a negative level in a period in which a voltage level of the selected local word line and a voltage level of each of the unselected local word lines are equalized.

7. The semiconductor device of claim 1, wherein the read voltage has a negative level and the pass voltage has a positive level.

8. The semiconductor device of claim 7,
wherein the well bias supplying circuit applies, to the well region, a first well bias having a first negative level in a read period in which the read voltage is applied to the selected local word line, and
wherein the well bias supplying circuit applies, to the well region, a second well bias having a second negative level greater than the first negative level in a period in which a voltage level of the selected local word line and a voltage level of each of the unselected local word lines are equalized.

9. The semiconductor device of claim 1, wherein each of the read voltage and the pass voltage has a positive level.

10. The semiconductor device of claim 9,
wherein the well bias supplying circuit applies, to the well region, a first well bias having a ground level in a read period in which the read voltage is applied to the selected local word line, and
wherein the well bias supplying circuit applies, to the well region, a second well bias having a negative level in a period in which a voltage level of the selected local word line and a voltage level of each of the unselected local word lines are equalized.

11. A semiconductor device comprising:
a cell array including memory cells connected to local word lines;
an operation voltage supplying circuit that applies a read voltage or a pass voltage to global word lines; and
a well bias supplying circuit, during a read operation, floating a well region of a pass transistor connected to a selected local word line, in a discharge period in which unselected local local word lines were discharged.

12. The semiconductor device of claim 11, wherein, before the discharge period, the operation voltage supplying circuit applies the read voltage to a global word line connected to the selected local word line and applies the pass voltage to a global word line connected to each of the unselected local word lines.

13. The semiconductor device of claim 11, wherein the read voltage has a negative level and the pass voltage has a positive level.

14. The semiconductor device of claim 13,
wherein the well bias supplying circuit applies, to the well region, a first well bias having a negative level in a read period in which the read voltage is applied to the selected local word line, and
wherein the well bias supplying circuit applies, to the well region, a second well bias having a ground level in a period in which a voltage level of the selected local word line and a voltage level of each of the unselected local word lines are equalized.

15. The semiconductor device of claim 11, wherein each of the read voltage and the pass voltage has a positive level.

16. The semiconductor device of claim 15, wherein the well bias supplying circuit applies, to the well region, a first well bias having a ground level in a read period in which the read voltage is applied to the selected local word line.

17. An operating method of a semiconductor device, the operating method comprising:
applying a read voltage to a selected local word line;
applying a pass voltage to at least one unselected local word line; and
discharging the unselected local word line,
wherein, in the applying of the read voltage, a first well bias having a first negative level is applied to a well region of a pass transistor that connects the selected local word line to a global word line, and
wherein, in the discharging, a second well bias having a negative level is applied to the well region.

18. The operating method of claim 17, further comprising equalizing a voltage level of the selected local word line and a voltage level of the unselected local word line,
wherein, in the equalizing, the second well bias having a negative level is applied to the well region.

19. The operating method of claim 17, wherein, in the discharging, a voltage level of the selected local word line drops to a negative level and rises to a ground level.

20. The operating method of claim 17, wherein the read voltage has a negative level.

21. An operating method of a semiconductor device, the operating method comprising:
applying a read voltage to a selected local word line;
applying a pass voltage to at least one unselected local word line; and
discharging the unselected local word line,
wherein, in the discharging, a well region of a pass transistor that connects the selected local word line to a global word line is floated.

22. The operating method of claim 21, further comprising equalizing a voltage level of the selected local word line and a voltage level of the unselected local word line.

23. The operating method of claim 22, wherein, when the read voltage has a negative level:
in the applying of the read voltage, a first well bias having a negative level is applied to the well region; and in the equalizing, a second well bias having a ground level is applied to the well region.

24. The operating method of claim 22, wherein, when the read voltage has a positive level, in the applying of the read voltage and in the equalizing, a well bias having a ground level is applied to the well region.

25. The operating method of claim 21, wherein, in the discharging, a voltage level of the selected local word line drops to a negative level and rises to a ground level.

* * * * *